J. CLARK & G. IRWIN.
REPAIR CLAMP FOR PIPE JOINTS OF THE BELL AND SPIGOT TYPE.
APPLICATION FILED MAY 20, 1912.
1,039,488.
Patented Sept. 24, 1912.
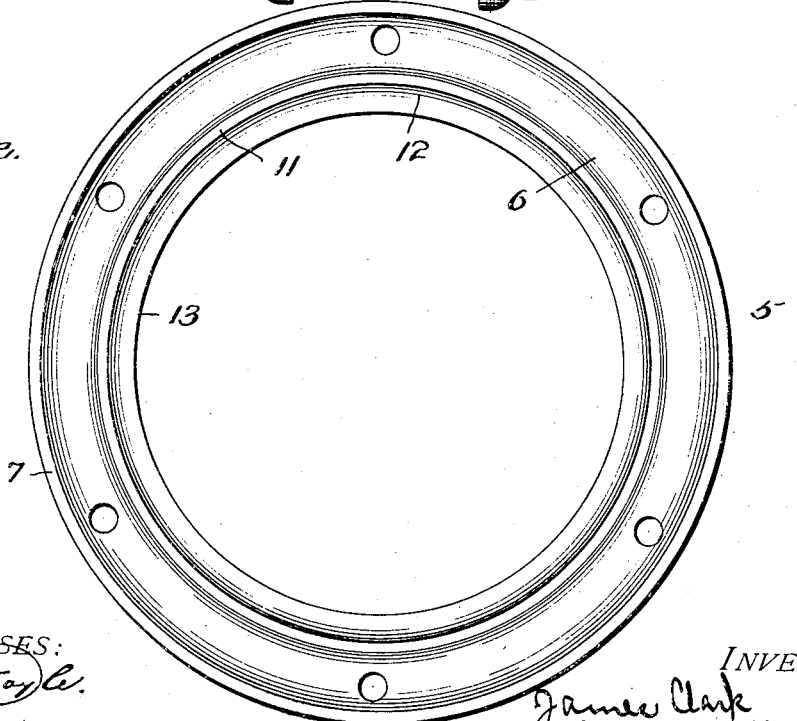

UNITED STATES PATENT OFFICE.

JAMES CLARK AND GUY IRWIN, OF BRADFORD, PENNSYLVANIA, ASSIGNORS TO S. R. DRESSER MANUFACTURING COMPANY, OF BRADFORD, PENNSYLVANIA, A CORPORATION OF PENNSYLVANIA.

REPAIR-CLAMP FOR PIPE-JOINTS OF THE BELL AND SPIGOT TYPE.

1,039,488.

Specification of Letters Patent. Patented Sept. 24, 1912.

Application filed May 20, 1912. Serial No. 698,561.

*To all whom it may concern:*

Be it known that we, JAMES CLARK and GUY IRWIN, citizens of the United States, residing at Bradford, in the county of McKean and State of Pennsylvania, have invented certain new and useful Improvements in Repair-Clamps for Pipe-Joints of the Bell and Spigot Type; and we do hereby declare the following to be a full, clear, and exact description of the invention, such as will enable others skilled in the art to which it appertains to make and use the same.

Our invention relates to wrought metal clamps for use in connection with pipe joints of the bell and spigot type, and consists in an improved clamping ring for use in such clamps, the novel features of the invention being hereinafter described with reference to the accompanying drawing, which shows one form of clamping ring in which we have contemplated embodying the invention and which is selected by us for purposes of illustration, and the said invention is fully disclosed in the following description and claims.

Referring to the said drawings, Figure 1 represents partly in section and partly in elevation a bell and spigot joint of the kind known in the art as a "Mattheson" joint, having applied thereto a clamp, including among its members, a clamping ring embodying our invention. Fig. 2 is an elevation of the said clamping ring detached.

Our invention relates to what are termed clamps or repair clamps for pipe joints of the bell and spigot type, which are ordinarily provided with a non-elastic packing usually lead or cement, said clamps having for their object to secure in position and compress an elastic or compressible gasket, usually of rubber, over the outer end of the bell, and the non-elastic packing to completely seal the space between the bell and spigot of adjacent pipe sections, and prevent leakage in case the non-elastic packing should not be perfectly tight. Such a clamp ordinarily comprises a clamping ring to engage and compress the elastic packing or gasket, a follower or "bull ring" to engage an exterior shoulder of the bell, and connecting bolts for drawing the clamping ring and follower toward each other to compress the gasket, and our invention resides in a novel construction of clamping ring for use in a clamp of this character, the novel features of which will be hereinafter described.

In the accompanying drawing we have shown an embodiment of our invention which we have selected for purposes of illustration in conjunction with the other parts of a clamp applied to the well known "Mattheson" joint but our improved clamping ring is also capable of use with any other form of bell and spigot joint.

In the drawing, 1 represents the bell end of a "Mattheson" pipe section, having the usual reinforcing ring 1$^a$, 2 represents the spigot end of an adjacent pipe section, which is inserted in the bell 1, and 3 represents the lead, or other non-elastic packing inserted between the spigot and bell.

4 represents an annular compressible packing or gasket, preferably of rubber, and substantially rectangular in cross section, which is placed around the spigot 2, and covers the mouth of the bell and the outer portion of the packing 3 therein.

5 represents our improved wrought metal clamping ring which may be made integral, or may be made in two or more segmental sections connected by bolts or rivets for convenience of manufacture, or for convenience in applying the clamp to the pipe after it has been laid. We prefer, however, to form the ring of wrought sheet metal, as steel, and to produce it by pressing an annular blank into the desired form, although it may be made in other ways. The blank referred to may be cut from a sheet of steel, or formed by bending a flat bar edgewise into circular form and welding the ends together.

The clamping ring 5 comprises an annular flat plate member 6 provided with a plurality of bolt holes around the same, and preferably having its outer portion bent to form the annular stiffening flange 7, and having at its inner edge an annular wall 8, bent at an angle to the plane of the plate member, and further stiffening the plate member. The wall 8 terminates in an annular flange 9, bent inward, and disposed transversely to the axis of the ring, and substantially parallel to the plate member, the metal is then bent sharply outward to form an annular flange 10 which is pressed close to the flange 9, adjacent to the junction of the two flanges, and has its outer portions 11 extending away from the flange 9, the flange 10 being curved in cross section so as to provide an annular concave packing engaging face 12, on the side farther from the plate member. The inner edges of the flange portions 9 and 10 where they are united are provided with a cylindrical face 13, which forms the pipe aperture of the ring.

We prefer to so form the ring that the annular wall will extend in a direct line from the inner edge of the plate member to substantially the center of the flange 10, which is wider than the flange 9, thus giving the wall 8 a conical form, decreasing in diameter from the plate member toward the flange 10, and enabling said wall to transmit the bolt pressure in a very direct manner to the packing ring or gasket 4. It will also be noted that the bending of the metal at the point 14 where flange 9 joins the wall 8, and at the point 15 where the flanges 9 and 10 unite, greatly stiffens the ring structure adjacent to the packing or gasket engaging portion. It is also to be noted that the flanges 9 and 10 being united adjacent to the pipe aperture the greatest strength of the metal is provided substantially in line with the space between the inner face of the bell 1 and the outer face of the spigot 2, or in other words in line with the packing recess of the joint which contains the non-elastic packing 3, and the outer portion 11 of the flange 10, is stiffened by being curved, as shown, so that it is not liable to bend appreciably. The flange 10 may, however, have a slight resiliency if desired adjacent to its outer end, in line with the end of the bell mouth and its reinforcing ring, so that it can yield in case the pressure between the parts and the flange 10 becomes great enough to bend the outer portion of the flange, without affecting the compression of the gasket against the non-elastic packing in the recess of the bell. The clamping ring will, therefore, compress the gasket 4 in a highly effective manner, and by reason of the concavity of the gasket engaging face 12 of flange 10, will tend to confine the packing ring and compress it toward the pipe aperture somewhat, as well as toward the bell.

In connection with our improved clamping ring we employ a follower or bull ring for engaging an exterior shoulder of the bell end 1, and we have shown herein a follower 16, provided with bolt holes, and having portions 17 to engage the shoulder of the bell, the particular form of this follower, however, forms no part of our present invention, and the clamping ring may be used with other forms of follower. 18, 18 represent the bolts connecting the clamping ring and follower and provided with nuts for drawing said parts together and compressing the gasket 4, thus effectively preventing leakage even though the non-elastic packing permitted a leak.

What we claim and desire to secure by Letters Patent is:—

1. A clamping ring for pipe joints of the bell and spigot type formed of wrought metal and comprising a flat annular plate member provided with bolt holes, an annular wall extending from the inner edge of said plate member, and angularly thereto, said wall terminating in an inwardly extending annular flange, and an outwardly extending annular flange, formed integrally with and bent sharply outward from the inwardly extending flange and having a gasket engaging face on the side farther from the plate member, the inner edges of said flanges where they are united, forming the pipe aperture of the ring, the bend at the junction of said flanges and the reverse bends at opposite ends of said annular wall giving the ring great rigidity with a minimum thickness and weight of metal.

2. A clamping ring for pipe joints of the bell and spigot type formed of a single piece of wrought sheet metal pressed into form, and comprising a flat annular plate member, provided with bolt holes, an annular wall extending from the inner edge of the plate member and connected thereto by an obtuse angular bend, said wall having at the opposite end an inwardly extending flange, disposed substantially perpendicular to the axis of the ring and connected to said wall by an obtuse angular bend, said ring having an outwardly extending flange bent sharply back from the inner edge of said inwardly extending flange and being curved in cross section in a direction away from the inwardly extending flange and the plate member, and having a packing engaging face on the side farther from the plate member.

In testimony whereof we affix our signatures, in the presence of two witnesses.

JAMES CLARK.
GUY IRWIN.

Witnesses:
M. E. CLARK,
H. M. WICK.